W. PHELAN.
Condenser.

No. 76,655.

Patented April 14, 1868.

Witnesses:
Geo L Bestor
Geo W Acker

Inventor:
William Phelan

United States Patent Office.

WILLIAM PHELAN, OF PEORIA, ILLINOIS.

Letters Patent No. 76,655, dated April 14, 1868.

IMPROVEMENT IN CONDENSERS.

*The Schedule referred to in these Letters Patent and making part of the same.*

TO WHOM IT MAY CONCERN:

Be it known that I, WILLIAM PHELAN, of Peoria city, Peoria county, Illinois, have invented a new and improved Apparatus for Condensing Steam from Steam-Boilers, and supplying distilled water for the use of steam-boilers; and I declare the following to be a full, true, and accurate description of the same, reference being had to the accompanying drawings, and the letters of reference marked thereon.

I will describe my invention, so that others skilled in mechanics may make and use the same.

I construct two cone-shaped shells, one smaller than the other, of any suitable material, usually iron, or, in small machines, of brass or copper. One of these being inserted in the other, leaves considerable space between the two. On the top of the outer cone I fasten a cap, that tapers rapidly, and connects with the pipe $h$, fig. 1.

Figure 1:
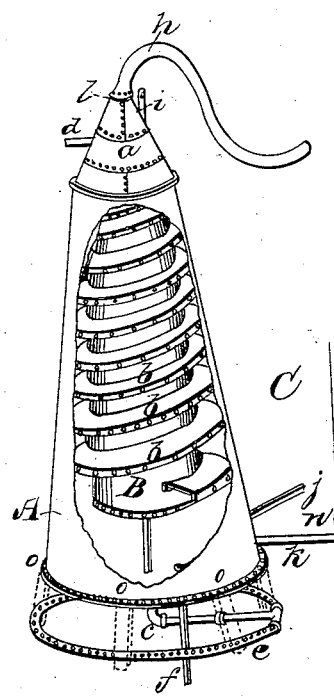
Figure 1 is a perspective view of the apparatus, with a part of the outer shell or cone removed, so as to show the inside.
Figure 2:
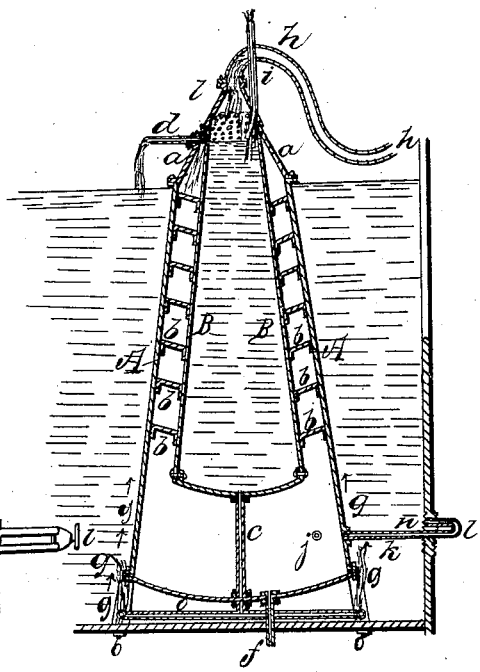
Figure 2 is a sectional elevation.
Figures 3, 6:
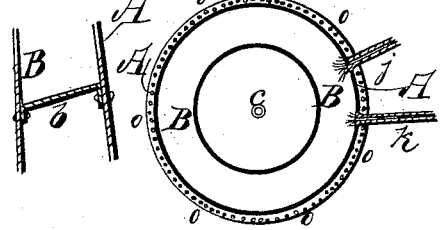
Figure 3 is a horizontal section.
Figure 4:
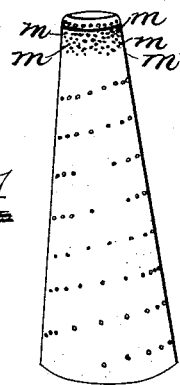
Figure 4 is a perspective view of the inside cone or shell.
Figure 5:

The small cone being inserted in the larger, as shown, reaches to the cap, and is riveted or fastened there, as shown at fig. 2. Around the inside cone, and between that and the outer cone, I construct a spiral partition. This partition connects with both cones, and forms a spiral chamber. This is shown at $b\ b\ b$, fig. 1. The inside of the smaller cone is filled with water, supplied through the pipe $i$, fig. 1, and is gradually emptied through the pipe $c$, thence passing through the perforations in pipe $e$ into the tank, shown at fig. 2. The supply-pipe is larger than the escape, so that the water in the inside cone is higher than in the tank outside. Waste-pipe $d$ carries off any surplus water.

Steam or vapor to be condensed is admitted through the pipe $j$, fig. 1, to the inside of the chamber; thence it passes up the spiral chamber, and is continually brought in contact with the sides of the two cones, and is condensed, and falls to the bottom of the chamber. The cones are kept cool by water inside the inner cone and outside the outer cone.

Through the inside cone, over the water-level, are perforated a number of holes, shown at $m$, fig. 2, through which any uncondensed vapor may escape, and through which air may be admitted. The water of condensation is taken through the pipe $f$ and passed into the boiler, thus supplying it with water free from any substance that will cause incrustation.

There will be a gradual waste of water from leakage and from evaporation, to supply which I fix a pipe with a valve, shown at $l\ n\ k$. This pipe conveys the water from the tank to the inside of the chamber, where it mixes with the distilled water, and is heated to the proper point and passed into the boiler.

What I claim as my invention, and desire to secure by Letters Patent, is—

1. The two cones, A B, the space between these provided with a spiral partition, thus forming a spiral chamber, surrounded by cold water, for the purpose of condensing steam or vapor, in the manner indicated.

2. I claim the supply-pipe and valve $l\ n\ k$, in connection with a condenser, of the construction indicated, to supply the incidental waste of water.

WILLIAM PHELAN.

Witnesses:
PHILLIP SMITH,
HENRY W. WELLS.